Figure 1:
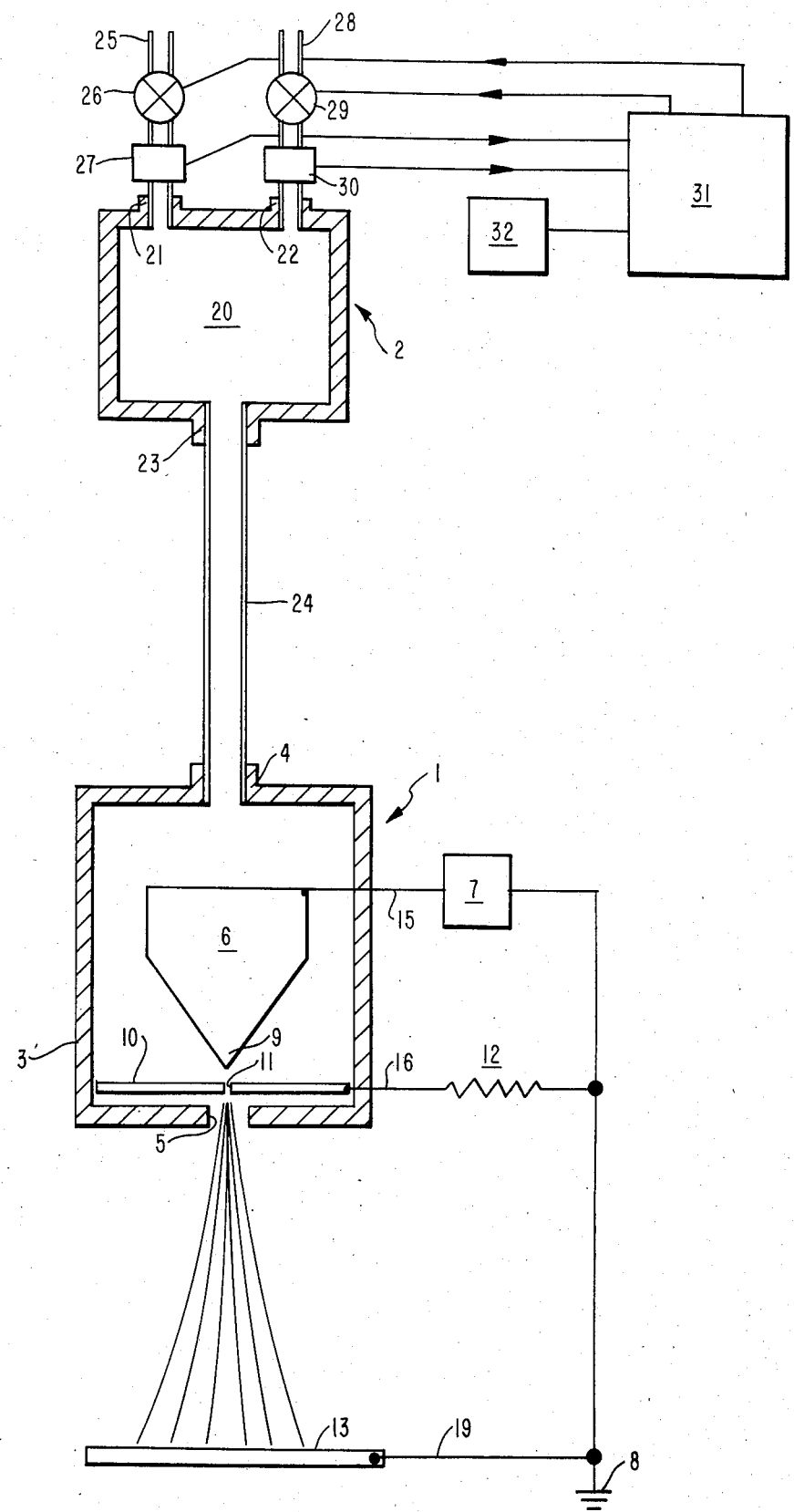

United States Patent [19]

Kelly

[11] Patent Number: 4,630,169

[45] Date of Patent: Dec. 16, 1986

[54] CHARGE INJECTION DEVICE

[75] Inventor: Arnold J. Kelly, Princeton Junction, N.J.

[73] Assignee: Exxon Research and Engineering Company, Florham Park, N.J.

[21] Appl. No.: 647,174

[22] Filed: Sep. 4, 1984

[51] Int. Cl.$^4$ .............................................. B05B 5/00
[52] U.S. Cl. ..................................... 361/225; 239/690
[58] Field of Search ............... 361/225, 226, 227, 228; 239/690, 398, 704; 204/168

[56] References Cited

U.S. PATENT DOCUMENTS

| | | | |
|---|---|---|---|
| 1,405,126 | 6/1922 | Harris | 204/189 |
| 1,559,036 | 10/1925 | Egloff et al. | 208/187 |
| 1,838,930 | 12/1931 | Fisher et al. | 204/188 |
| 2,857,978 | 10/1958 | Lenger | 183/7 |
| 3,073,775 | 1/1963 | Waterman | 204/302 |
| 4,093,430 | 6/1978 | Schwabe et al. | 55/107 |
| 4,255,777 | 3/1981 | Kelly | 239/704 |
| 4,380,786 | 4/1983 | Kelly | 239/690 |
| 4,435,261 | 3/1984 | Mintz et al. | 204/168 |
| 4,467,961 | 8/1984 | Coffee et al. | 361/228 |

Primary Examiner—L. T. Hix
Assistant Examiner—David M. Gray

[57] ABSTRACT

In charge injection apparatus comprising essentially a charge injector (1) and a fluid supply arrangement (2) for the charge injector, fluid to be charged is introduced into a mixing chamber (20) via a supply line (25) where it becomes mixed with a volatile fluid, such as a high vapor pressure hydrocarbon or a halogenated component supplied through line (28). The resulting fluid mixture is introduced into the charge injector and, on emerging through the exit orifice (5) of the charge injector into ambient atmosphere, the volatile fluid volatilizes to form a blanket of gas of higher dielectric strength than that of the ambient atmosphere. In this way, resistance to dielectric breakdown is increased which enables the charge injector to be operated at higher potentials then would be the case in the absence of the volatilized fluid, without dielectric breakdown occurring.

21 Claims, 4 Drawing Figures

CHARGE INJECTION DEVICE

BACKGROUND OF THE INVENTION

This invention relates to apparatus and a method for injecting charge into a fluid and finds particular application where it is desired to maximise the output charge density levels obtainable from a charge injector.

DESCRIPTION OF THE PRIOR ART

Electrostatic free charge injectors are known in the art. An example of such an injector is disclosed in U.S. Pat. No. 4,255,777 obtained from Ser. No. 853,499, filed Nov. 21, 1977 in the name of Arnold J. Kelly and assigned to the present assignees. The injector is designed to electrostatically charge a liquid stream and discharge it into ambient atmosphere, the stream breaking up into finer droplets or atomising under the influence of the injected free charge to form a spray. The charge injector comprises essentially a chamber through which liquid can flow, a low-voltage electrode at one end of the chamber defining a discharge orifice, a pointed high-voltage electrode arranged with its tip close to, and in axial alignment with, the discharge orifice and an earthed electrode outside the chamber downstream from the discharge orifice so as to complete the electrical circuit of the charge injector. Various applications of the charge injector are disclosed in U.S. Pat. No. 4,255,777 such as electrostatic coating or spraying or the atomisation of hydrocarbon fuel delivered to the combustion chamber of domestic and industrial oil burners.

In certain circumstances, it may be required to maximise the output charge density levels produced by the charge injector. However, at a certain operating potential, the charge injector fails to continue to operate normally and very significantly reduced charging levels result for the fluid exiting the charge injector.

Reference is directed to U.S. Pat. application Ser. No. 601,253, filed on Apr. 17th, 1984 and assigned to the present assignees, which addresses itself to situations where it is desired to reduce the ambient pressure downstream of the injector. One example is an electrostatic separation technique to separate water droplets suspended in oil in which firstly free charge is injected into the mixture using a charge injector and then the charged mixture passes as a spray or continuous stream through a gas or vapor space and into a treatment vessel, avoiding contact with the separation vessel walls while passing through the gas or vapor space. In the separation vessel, the charged emulsion comes into contact with a bed or porous collector beads on which water droplets coalesce, subsequently become re-entrained into the oil, and then settle out under gravity. The removal of the water from the oil is facilitated by exposure of the contaminated oil stream issuing from the charge injector to reduced pressure or vacuum conditions. The reduced pressure, however, reduces the charging level and charge transport efficiency achieved with the charge injector.

The aforesaid U.S. Pat. application Ser. No. 601,253 overcomes this problem by raising the ambient pressure above the reduced pressure value in an enclosed region immediately downstream of the discharge orifice of the charge injector. The enclosed region can be the internal space within a second chamber which is supplied directly with compressed air and has an outlet orifice in alignment with the discharge orifice so that the charged fluid passes, together with the compressed air, through the chamber and out through the outlet orifice into the low pressure downstream region. In order to avoid dielectric breakdown downstream of the discharge orifice of the charge injector, sulfur hexafluoride or any other blanketing gas which can act to reduce or avoid breakdown can be used in place of air for pressurising the interior of the second chamber.

The following patents are also of some interest. U.S. Pat. No. 1,838,930 (H. F. Fisher et al) relates to an electrical treater in which emulsion to be treated is firstly passed through a primary electrical treatment stage, and the lighter and heavier parts of the liquid from that stage are respectively passed through secondary and tertiary electrical treatment stages. The dielectric strength of the emulsion can be increased by introducing gas in suitable quantities which forms into bubbles which prevent a continuous electrically conductive path from being formed between the electrodes of the treater.

In U.S. Pat. No. 1,405,126 (F. W. Harris), an emulsion to be dehydrated is injected into a body of relatively dry emulsion and the dry emulsion is circulated over a closed path between charged electrodes in a separation vessel. Water precipitates to the bottom of the body of emulsion where it is withdrawn and the desired product is withdrawn from the top. Air is introduced into the vessel under pressure through a nipple, so as to cause rapid circulation of the emulsion through the electrode region. This rapid circulation helps to reduce the risk of dielectric breakdown in the inter electrode region.

Reference is also made to the oil dehydrating process disclosed in U.S. Pat. No. 1,559,036 (Egloff et al), in which an electrolyte substance, which may be a gas, liquid or solid, is added to the oil and water to reduce the interfacial film between the oil and water and increase the conductivity of the emulsion.

Finally, reference is made to U.S. Pat. No. 3,073,775 (Waterman) in which a complicated electrical treater is used for treating oil-continuous dispersions. Air is introduced as various points in the treater, to maintain certain pressure levels at those locations for the purpose of determining residence times there.

It is remarked that, in contrast with the present invention, none of Fisher, Harris, Egloff and Waterman is concerned in any way with charge injectors or the problems of dielectric breakdown in such charge injectors.

SUMMARY OF THE INVENTION

The present invention is based upon the hitherto unrecognized fact that although the charge injection process occurs in a charge injector within the inter-electrode region inside the charge injector, the breakdown of the gaseous media surrounding the exiting jet, in the immediate vicinity of the outlet orifice, can influence the overall charge injection process. In particular, it has now been recognized that ionization of the background air or gas enveloping the exiting jet causes the low voltage electrode to act as if it were a downstream-extending blunt electrode with the result that the charge density profiles in the exiting jet can relax to a minimum charge density configuration prior to jet break-up into droplets.

In accordance, then, with the present invention, there is provided charge injection apparatus which comprises a charge injector having a high potential electrode with a pointed tip for injecting charge into the fluid to be charged, and an exit orifice, downstream of the point of the electrode, through which the charged fluid issues as a jet. The jet may take the form of a spray but it is immaterial to the invention whether the jet is a continuous stream or a spray (i.e. fine droplets). Additionally, the charge injection apparatus comprises means for introducing into the first-mentioned fluid, a volatile liquid which volatilizes on emerging from the exit orifice. The dielectric strength of the vapor of the volatilized fluid is such as to oppose any tendency to dielectric breakdown occurring. Normally, the dielectric strength of the vapor of the fluid to be charged is greater than that of the ambient atmosphere into which the jet of charged fluid issues from the charge injector. In that event, it is necessary only that the dielectric strength of the vapor of the volatile fluid is greater than that of the ambient atmosphere, in order to secure the improved performance which is achievable with this invention. However, optimum improvement is obtained when the dielectric strength of the volatile fluid vapor exceeds that both of the ambient atmosphere and of the fluid to be charged.

It will be appreciated, then, that the present invention poses a particularly simple solution to the problem of dielectric breakdown. Specifically, the spray fluid produced by the charge injector is modified by the presence of the volatilized liquid which serves as a blanketing gas upon volatilization. It will be further appreciated that the introduction of a volatile component into the fluid to be charged is in most atmospheric applications (such as paint and agricultural spraying, medical and grooming aided dispersal) a much simpler and more direct means to attain performance from the charge injector than by making provision for an external supply of gas directly to the region where dielectric breakdown is prone to occur. Furthermore, the invention does not require the charge injector to have a special construction but can be put into effect merely by a simple modification to the fluid supply line to an existing charge injector, or by the addition of appropriate volatile adjuvants to the fluid to be charged, i.e. the fluid supplied to the charge injector can be a two-component fluid, comprising a blend of a component to be charged and a volatile component which serves as a blanketing gas when it volatilizes on emerging from the charge injector. It should be noted that to incorporate the volatile fluid initially as part of the fluid to be supplied to the charge injector represents a particularly convenient way of achieving the intended result.

Any convenient way of introducing the volatile fluid into the fluid to be charged can be adopted, but a particularly convenient and simple way is to use a mixing chamber for mixing together the two fluids before they enter the charge injector. The mixing chamber may comprise respective inlets for the two fluids and an outlet connected by a conduit to the inlet of the charge injector.

For optimum performance, the relative proportions of the fluid to be charged in the volatile fluid are carefully chosen and maintained. For this purpose, the charge injection apparatus may preferably comprise respective flow control valves for regulating the flow rates of the two fluids supplied to the mixing chamber inlet, respective means for monitoring the flow rate determined by the flow control valves, and control means for controlling the settings of the flow control valves for opposing changes in the monitored flow rates from respective predetermined values.

A preferred embodiment of the invention comprises:

(a) a chamber having an inlet and an exit orifice;

(b) means for mixing together a fluid to be charged and a volatile fluid whose vapor is of higher dielectric strength than the ambient atmosphere into which the exit orifice discharges;

(c) conduit means connecting the mixing means to the chamber inlet for conveying the fluid mixture to said chamber;

(d) first, high potential, electrode means in said chamber adjacent said exit orifice, said electrode means having a pointed tip for injecting charge into the fluid mixture before it exits the chamber through said orifice;

(e) second, low potential, electrode means in said chamber between the first electrode means and said exit orifice; and (f) third, earth potential, electrode means located downstream of said exit orifice;

the arrangement being such that the charged fluid mixture issues through the exit orifice as a jet and the volatile fluid component of the fluid mixture volatilizes on emerging from the exit orifice so as to oppose any tendency to dielectric breakdown occurring.

In accordance with another aspect of the invention, there is provided a method of operating a charge injector having a high potential electrode with a pointed tip for injecting charge into a fluid to be charged and an exit orifice, downstream of the pointed electrode, through which the charged fluid issues as a jet, said method comprising passing through the charge injector a two-component fluid comprising a first component which it is desired to charge and a second component which is a volatile fluid whose vapor is of such a dielectric strength that said volatile fluid volatilizes, as the two-component fluid emerges from said exit orifice, to oppose any tendency to dielectric breakdown occurring.

In accordance with one way of putting the invention into effect, the first fluid component is a liquid saturated with a gas which is the second fluid component. The dissolved gas then vaporizes from the charged jet emerging from the charge injector and forms a blanketing protective sheath around the jet. The second fluid component could be a dichloro-difluoro methane (Freon 12).

According to another way of performing the inventive method, the premixing at source of a volatile additive with the fluid to be sprayed provides a very simple and direct means by which the benefits of a high dielectric breakdown strength blanketing vapor can be obtained. Therefore, in one way of putting the method into effect, the two-component fluid is supplied from a source comprising a mixture of the two fluid components. Alternatively, the second fluid component is blended with the first fluid component flowing from a source of that first fluid component to the charge injector, to form said two-component fluid.

In accordance with a preferred method of performing the invention there is provided a method of operating a charge injector having a high potential electrode with a pointed tip for injecting charge into a fluid to be charged and an exit orifice, downstream of the pointed electrode, through which the charged fluid issues as a jet into an ambient atmosphere, said method comprising introducing into the first-mentioned fluid, a volatile fluid of higher dielectric strength than that of said ambient atmosphere, so that said volatile fluid volatilizes on emerging from said exit orifice to oppose any tendency to dielectric breakdown occurring.

As indicated earlier in this specification, the volatile fluid may be a gas (e.g. Freon-12, which is dichloro difluoro methane) which is introduced into the first-mentioned fluid which itself is a liquid, so that the liquid becomes saturated with the introduced gas and that gas vaporizes from the jet issuing from the charge injector.

As indicated above, a preferred method of introducing the volatile fluid into the fluid to be charged is by mixing the two fluids in a mixing chamber and introducing the resulting mixture into the charge injector.

Suitably the volatile fluid is a hydrocarbon, e.g. a high vapor pressure hydrocarbon having four or more carbon atoms per molecule. Alternatively or in addition, the hydrocarbon may have one or more double bonds. An example of such a hydrocarbon is 1,3 butadiene. As an alternative, the volatile fluid may be a halogenated or oxygenated compound.

Specific examples of preferred volatile fluids are propane, n-butane, iso-butane, ethylene, propylene, butene, acetylene, hexene, and cyclohexane.

Figure 2:
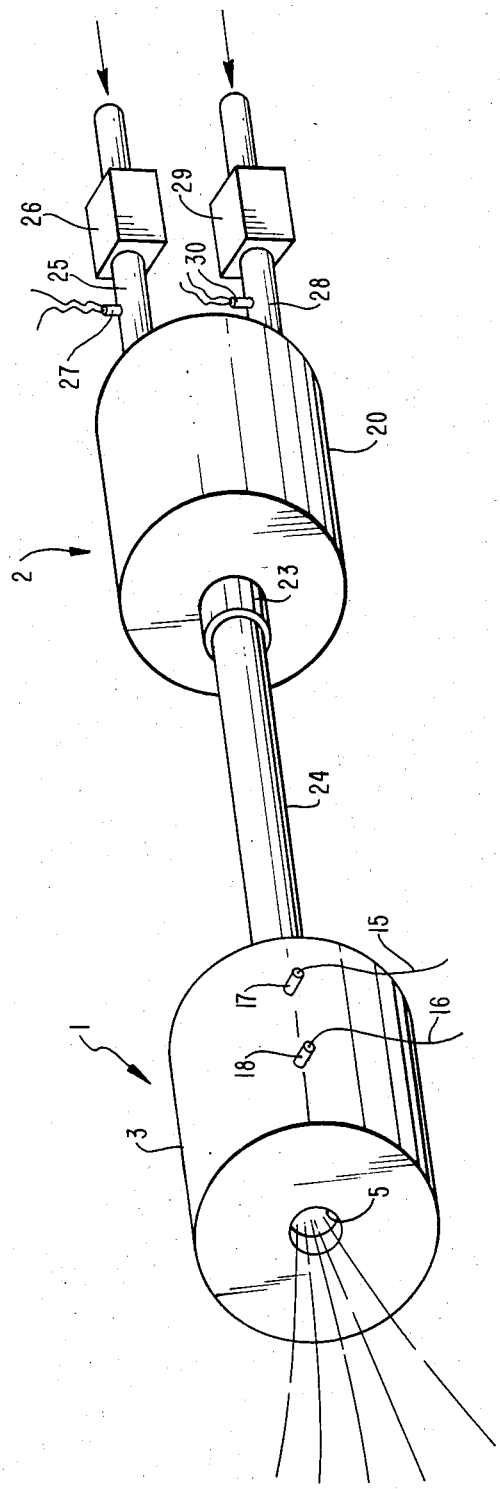
Figure 3:
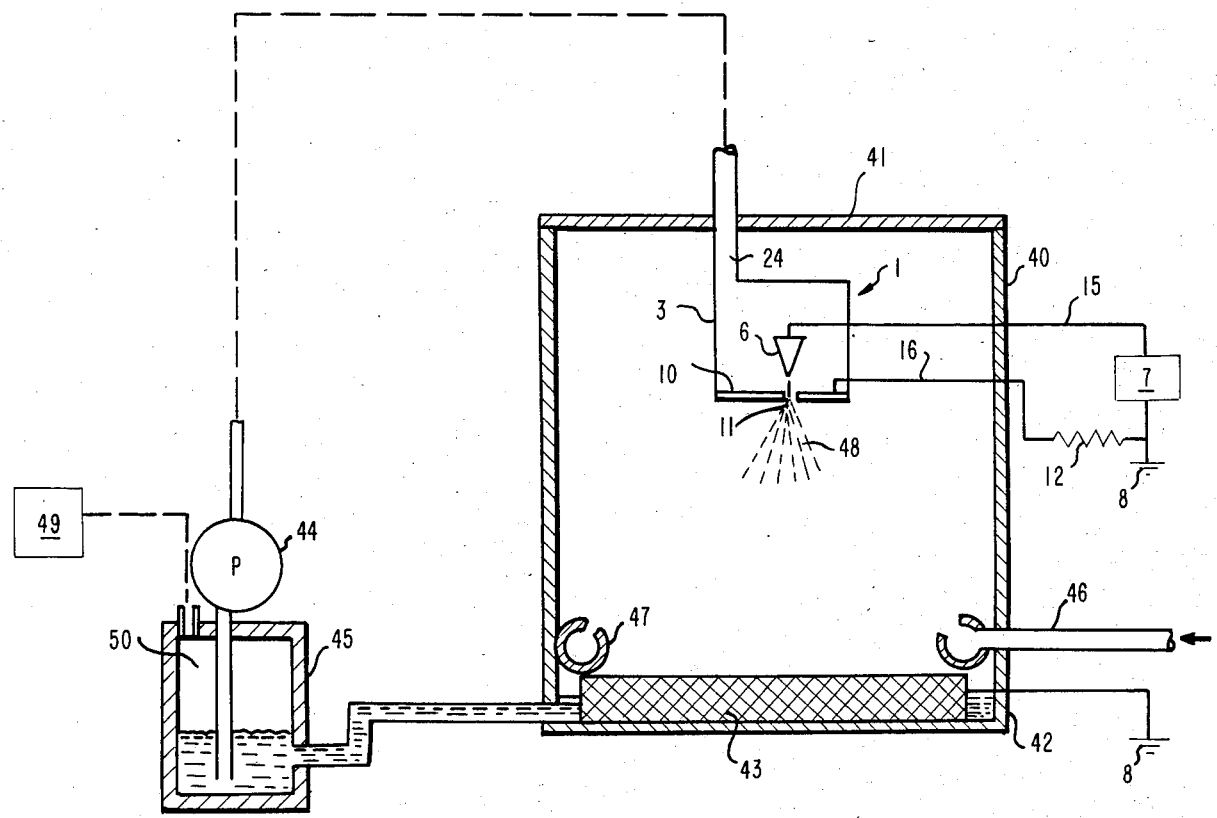
Figure 4:
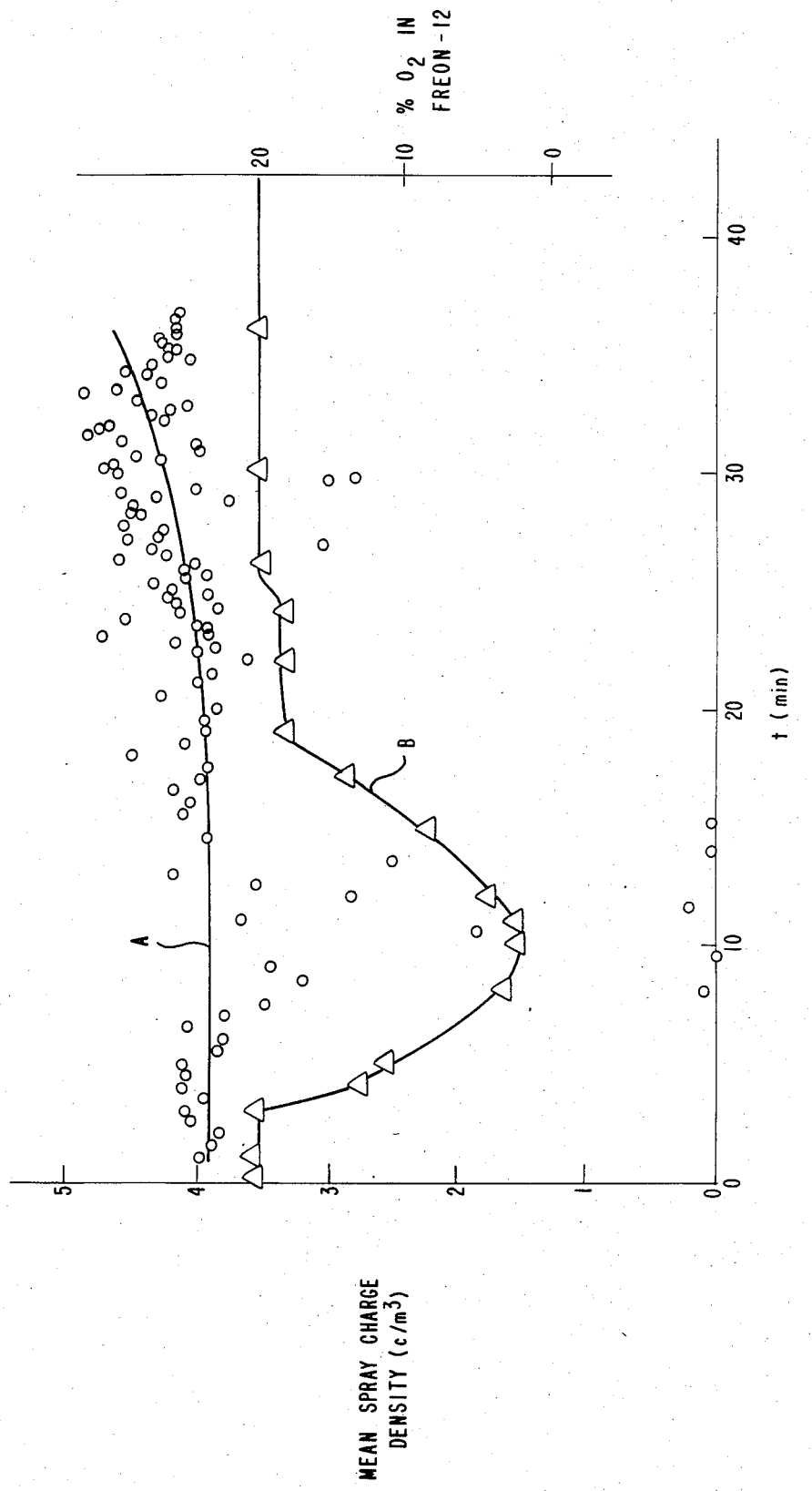

For a better understanding of the invention and to show how the same may be carried into effect, reference will now be made, by way of example, to the accompanying drawings, in which:

FIG. 1 is a diagrammatic longitudinal sectional view through one embodiment of the invention;

FIG. 2 is a simplified perspective view of the charge injection apparatus of FIG. 1; and FIGS. 3 and 4 are respectively a very diagrammatic representation of the apparatus used, and graphs of the experimental data obtained therefrom, for demonstrating the beneficial effect on charge injector performance when the liquid to be charged is saturated with a gas of higher dielectric strength than the ambient atmosphere in which the charge injector is disposed.

Referring to FIGS. 1 and 2, there is shown charge injection apparatus for charging a fluid which comprises a charge injector 1 and fluid supply equipment, denoted generally by reference numeral 2. The charge injector 1 comprises a cylindrical housing 3 having a fluid inlet 4 in one end and an exit orifice 5 in the other end. Mounted centrally within housing 3 is a high potential negative electrode 6 connected, through electrical connecting lead 15, to a high voltage, negative biasing, source or battery 7 which is earthed at 8. The electrode 6 tapers at one end to a conical tip 9 and is arranged with its axis co-linear with the axis of exit orifice 5 and with its conical tip 9 closely adjacent to orifice 5. An intermediate potential electrode 10 is disposed within housing 3 between the conical tip 9 of electrode 6 and the exit orifice 5 and a central aperture 11 in electrode 10 is arranged co-linearly with the common axis of electrode 6 and exit orifice 5. Intermediate potential electrode 10 is connected by electric lead 16 to earth 8 through biasing resistor 12. A third electrode 13, which completes the electrical circuit of the charge injector, is arranged outside the cylindrical housing 3 and connected to earth 8 so as to be maintained at all times at earth potential. In the embodiment illustrated, electrode 13 is located, spaced well away from exit orifice 5. Where the equipment is used for electrostatic paint spraying for example, electrode 13 would provide the surface to be painted. However, other arrangements are possible such as where the charge injector is located above a separation vessel of an electrostatic, charge injection, separation apparatus, in which event the separation vessel itself can serve as earth electrode 13 or, alternatively, electrode 13 can be located immersed in the charged fluid in the separation vessel. These various alternative arrangements all fall within the scope of the invention as defined by the appended claims.

FIG. 2, in which electrode 13 has been omitted for simplicity, shows that the connecting leads 15 and 16 of electrodes 6 and 10 are led out through the wall of the cylindrical housing 3 by means of insulating bushings 17, 18, respectively.

The fluid supply equipment 2 in this embodiment comprises a mixing chamber 20 having respective inlets 21, 22 (shown only in FIG. 1) for the fluid to be charged and for a volatile fluid to be mixed with the fluid to be charged. Mixing chamber 20 is also provided with a fluid outlet 23 which is connected by a supply conduit or pipe 24 to the fluid inlet 4 of charge injector 1.

The supply line 25 to inlet 21 includes a solenoid-operated, flow control valve 26 and a flow rate detector 27 which produces an electrical output signal representative of the flow rate determined by the setting of control valve 26. Similarly, supply line 28 to inlet 22 includes a flow control valve 29 and flow rate detector 30. The settings of flow control valves 26, 29 are regulated by a controller 31 which respond to differences between the electrical output signals from the flow rate detectors 27, 30 and input electrical signals from a manually set, desired flow rate, input circuit 32, so as to oppose any changes in measured flow rates for the fluid to be charged and the volatile fluid from desired flow rates.

In operation, fluid to be charged and a suitable selected volatile fluid are introduced in desired proportions determined by the manual setting of input circuit 32 are introduced into mixing chamber 20 and the fluid mixture passes along pipe 24 and into the chamber defined within cylindrical housing 3 of the charge injector 1. As the fluid mixture passes the tip 9 of the high potential electrode 6, excess charge carriers are induced to be emitted into the fluid mixture at or near the electrode tip when this electrode is maintained at a sufficiently high negative potential with respect to the intermediate potential electrode 10. The charge carriers are then swept from the pointed electrode 6 by the cross flow of the fluid mixture which then issues as a jet or spray axially through the exit orifice of the charge injector. As the jet emerges through the exit orifice 5, it experiences a reduction in the ambient pressure which is lower outside the cylindrical housing 3 than inside it, and this reduction in pressure causes the volatile fluid to volatilize and thereby form a blanket of gas enveloping the exiting fluid jet or spray which, because it is of higher dielectric strength than the ambient atmosphere, serves to resist any tendency to dielectric breakdown on emerging from the exit orifice 5. In this way, the charge injector can be operated at higher potentials than would otherwise be the case while at the same time avoiding dielectric breakdown.

EXAMPLE

The benefit of blanketing the exiting spray from a charge injector with a blanketing gas by introducing into the charge injector the liquid to be charged which is saturated with that gas has been demonstrated by the inventor using apparatus, very diagrammatically represented in FIG. 3. The charge injector 1 was of similar construction to that of the charge injector in the FIGS.

1 and 2 embodiment and therefore is not described in detail but its corresponding components are denoted by the same reference numerals as in FIGS. 1 and 2.

In the experimental apparatus, the charge injector 1 was centrally located in an upright 15" diameter right circular cylindrical test enclosure 40 made of Lucite (polymethylmethacryte). The enclosure top was closed with a Lucite disc 41 while the bottom rested on a shallow collection pan 42, in which a one-inch thick section of ⅛" cell aluminium honeycomb 43 was placed to provide a splash-free spray collection surface spaced below the exit orifice of the charge injector at a distance in the range 10 to 30 cm so that the exiting spray from the charge injector was intimately exposed to the gas inside the test enclosure. This honeycomb 43 was connected to ground 8 and served to ensure that all incident droplet charge would have ample opportunity to drain off and be properly monitored.

The spray liquid collected in the pan 42 are recirculated, via a pump 44 with pump reservoir 45, to the charge injector 1, so that at any one time between 2 and 3 liters of test fluid was contained within the flow circuit (reservoir, pump, charge injector, pan and plumbing). Under normal operating conditions, the nominal 1 mL/sec charge injector flow rate produced a fluid recycling time of about half an hour. In tests (not described in detail herein), to avoid the possibility of spray ignition by electrical discharge, the test enclosure 40 was continuously purged by nitrogen from a laboratory supply. The nitrogen was supplied along purge line 46 to an annular gas distributing ring 47 resting on the honeycomb section 43 and delivering a blanket of purge nitrogen completely enveloping the exiting spray 48 from the charge injector. For this purpose, the distribution ring 47 was made from ¾" diameter plastics tubing formed with 3 mm diameter holes at 3 cm intervals. This arrangement provided a reasonably uniform and low turbulence means for filling the test enclosure with gas. For tests where Freon-12 was used to fill the enclosure 40, the nitrogen purge line 46 was simply connected to a Freon-12 source. Because the gas was introduced by an annular distributor, the dense Freon gas quite literally behaved like a liquid and filled the container 40 from the bottom up during the test.

Spray fluid that collects in the enclosure pan 42 was returned directly to the pump reservoir 45. This process was assisted by use of a laboratory vacuum system 49 which maintains a slight subatmospheric reservoir pressure. By holding the reservoir at below ambient, a positive flow of fluid from the pan is ensured. This was found to be particularly important with viscous spray fluids which have a tendency to puddle and not gravity feed very effectively.

In addition to guaranteeing effective siphoning of the collected spray fluid, the low reservoir ullage pressure served to maintain a continuous flow of the enclosure purge gas into the pump reservoir. The purge gas mixed with the returning fluid as it passed in slug and bubbling flow to the reservoir and this gas then bubbled through the liquid in the pump reservoir and formed a protective blanket 50 over the stored liquid. This not only effectively prevented an explosive vapor mixture from forming but also quaranteed that the test liquid would be saturated with the purge gas. This latter factor was particularly pertinent to the Freon-12 purge test results.

Evidence for charge injector performance being influenced by the evolution of a volatile blanketing gas from the spray fluid is seen in FIG. 4. This Figure represents a time history of the behavior (in the form of the mean spray charge density (in Coulombs per cubic meter)—see plot A) of the charge injector operating on a recirculating fluid (Marcol-87 which is a white oil manufactured by Exxon Company, U.S.A) during purging with Freon-12 (dichloro difluoro methane). Despite significant data scatter due to extraneous operating problems unrelated to the experiment the measured mean charge density of the charge injector spray displayed an increasing trend from time 20 minutes onwards. The enclosure Freon-12 level was inferred from the $O_2$ concentration readings (taken from an $O_2$ monitoring tube (not shown) located at the same height and within 5 cm of the charge injector exit orifice 11) which are also plotted (plot B).

As shown, the charge injector performance stayed approximately constant throughout the active Freon-12 purge portion of the test (the first 20 minutes). During this phase, the enclosure was actively purged with Freon-12 from a 50 pound capacity cannister. Complete displacement of the initial air in the enclosure occurs at about the ten-minute mark when the free $O_2$ concentration has dropped to approximately 2% (plot B). At this point, expansion cooling of the Freon started to seriously reduce the cannister pressure. Cooling persisted to such an extent that virtually no flow to the enclosure could be obtained with the cannister valve being shut at about 25 minutes. At this point, air which had diffused into the test enclosure had effectively displaced the Freon as indicated by the $O_2$ level on plot B returning to 20%. In view of the proximity of the $O_2$ monitoring tube to the exit orifice 11 of the charge injector, this indicated that the charge injector was immersed in ambient air with only a minor Freon content.

Despite the enclosure background gas having returned to ambient conditions, the charge injector output charge density shows a monotonic rise starting at about the 20 minute mark. This time is consistent with the pump system recirculation time scale. That is, a parcel of fluid (Marcol-87) that had been sprayed and intimately exposed to the enclosure Freon-12 early in the test, would be saturated with Freon, and would be expected to be recycled to the charge injector starting at this time.

There is no other explanation for the observed ~20% increase in performance exhibited by these data that can be used to refute the proposed self blanketing of the Freon-12 saturated test fluid.

What is claimed is:

1. Charge injection apparatus which comprises:

(a) a charge injector having a high potential electrode with a pointed tip for injecting charge into a first fluid to be charged and an exit orifice, downstream of the pointed electrode, through which the charged fluid issues as a jet;

(b) means for combining with said first-mentioned fluid a second fluid which is of sufficient volatility that it volatilizes, on emerging from said exit orifice, to form a blanket of vapor enveloping the charged first fluid issuing from said exit orifice, the dielectric strength of the vapor of said volatilized second fluid being such as to oppose any tendency to dielectric breakdown occurring; and (c) a source of said second fluid, said source being connected to said fluid combining means for supplying said second fluid thereto.

2. Charge injection apparatus according to claim 1 wherein said fluid combining means comprises a mixing chamber for mixing together said first fluid to be charged and said second fluid before they enter the charge injector.

3. Charge injection apparatus according to claim 2, wherein the mixing chamber comprises respective inlets for said first fluid to be charged and for said second fluid, and an outlet connected by a conduit to said inlet of the charge injector.

4. Charge injection apparatus according to claim 3, comprising respective flow control valves for regulating the flow rates of said first fluid to be charged and said second fluid to the mixing chamber inlets, respective means for monitoring the flow rates determined by the flow control valves, and control means for controlling the settings of the flow control valves for opposing changes in said monitored flow rates from respective predetermined values.

5. Charge injection apparatus for charging a first fluid, comprising:
(a) a chamber having an inlet and an exit orifice;
(b) a source of second fluid;
(c) means for mixing together (a) said first fluid to be charged and said second fluid from said source;
(d) conduit means connecting the mixing means to the chamber inlet for conveying the fluid mixture to said chamber;
(e) a first, high potential, electrode means in said chamber adjacent said exit orifice, said electrode means having a pointed tip for injecting charge into the fluid mixture before it exits the chamber through said orifice;
(f) second, low potential, electrode means in said chamber between the first electrode means and said exit orifice; and
(g) third, earth potential, electrode means located downstream of said exit orifice;
said second fluid being of such volatility and the arrangement being such that the charged fluid mixture issues through the exit orifice as a jet and the volatile fluid component of the fluid mixture volatilizes, on emerging from said exit orifice, so as to form a blanket of vapor enveloping the charged first fluid exiting said exit orifice, and the vapor having a dielectric strength which is higher than that of the ambient atmosphere into which the exit orifice discharges, so as to oppose any tendency to dielectric breakdown occurring.

6. A method of operating a charge injector having a high potential electrode with a pointed tip for injecting charge into a fluid to be charged and an exit orifice, downstream of the pointed electrode, through which the charged fluid issues as a jet, said method comprising passing through the charge injector a two-component fluid comprising a first component which it is desired to charge and a second component which is a volatile fluid having sufficient volatility that it volatilizes, as the two-component fluid emerges from said exit orifice, to form a blanket of vapor enveloping the charged first fluid component, the vapor of the volatile fluid being of such a dielectric strength as to oppose any tendency to dielectric breakdown occurring.

7. A method according to claim 6, wherein said first fluid component is a liquid saturated with a gas which is said second fluid component.

8. A method according to claim 6, wherein the two-component fluid is supplied from a source comprising a mixture of the two fluid components.

9. A method according to claim 6, wherein the second fluid component is blended with the first fluid component flowing from a source of that first fluid component to the charge injector, to form said two-component fluid.

10. A method of operating a charge injector having a high potential electrode with a pointed tip for injecting charge into a fluid to be charged and an exit orifice, downstream of the pointed electrode, through which the charged fluid issues as a jet into an ambient atmosphere, said method comprising introducing into the first-mentioned fluid, a volatile fluid whose vapor is of higher dielectric strength than that of said ambient atmosphere, said volatile fluid having sufficient volatility that is volatilizes, on emerging from said exit orifice, to form a blanket of vapor enveloping the charged first-mentioned fluid and thereby oppose any tendency to dielectric breakdown occurring.

11. A method according to claim 10, wherein said volatile fluid is mixed with said fluid to be charged in a mixing chamber and the resulting mixture is introduced into the charge injector.

12. A method according to claim 10, wherein said volatile fluid is a hydrocarbon.

13. A method according to claim 10, wherein said volatile fluid is a high vapor pressure hydrocarbon.

14. A method according to claim 12, wherein said hydrocarbon has four or more carbon atoms per molecule.

15. A method according to claim 12, wherein said hydrocarbon has one or more double bonds.

16. A method according to claim 15, wherein said hydrocarbon is 1,3 butadiene.

17. A method according to claim 10, wherein said volatile fluid is a halogenated compound.

18. A method according to claim 10, wherein said volatile fluid is an oxygenated compound.

19. A method according to claim 12, wherein the volatile fluid is selected from the group consisting of propane, n-butane, iso-butane, ethylene, propylene, butene, acetylene, hexene, and cyclohexane.

20. A method according to claim 10, wherein said volatile fluid is a gas which is introduced into said first-mentioned fluid which is a liquid, so that said liquid becomes saturated with said gas and said gas vaporizes from the jet issuing from the charge injector.

21. A method according to claim 20, wherein said volatile fluid is dichloro-difluoro methane.

* * * * *